(12) United States Patent
Kusuura

(10) Patent No.: US 8,956,038 B2
(45) Date of Patent: Feb. 17, 2015

(54) LIGHTING DEVICE HAVING A LIGHT GUIDE STRUCTURE

(75) Inventor: Takahisa Kusuura, Kawasaki (JP)

(73) Assignee: Empire Technology Development LLC, Wilmington, DE (US)

( * ) Notice: Subject to any disclaimer, the term of this patent is extended or adjusted under 35 U.S.C. 154(b) by 181 days.

(21) Appl. No.: 13/575,367

(22) PCT Filed: Feb. 22, 2012

(86) PCT No.: PCT/JP2012/001215
§ 371 (c)(1),
(2), (4) Date: Jul. 26, 2012

(87) PCT Pub. No.: WO2013/124895
PCT Pub. Date: Aug. 29, 2013

(65) Prior Publication Data
US 2013/0215646 A1 Aug. 22, 2013

(51) Int. Cl.
*G02B 6/02* (2006.01)
*F21V 8/00* (2006.01)

(52) U.S. Cl.
CPC .............. *G02B 6/006* (2013.01); *G02B 6/0048* (2013.01); *G02B 6/0065* (2013.01); *G02B 6/0051* (2013.01)
USPC ............................ 362/616; 362/606; 362/612

(58) Field of Classification Search
CPC .. G02B 6/0076; G02B 6/0051; G02B 6/0055; G02B 6/0065; G02B 6/0048
USPC .................... 362/616, 612, 606, 84, 608, 609
See application file for complete search history.

(56) References Cited

U.S. PATENT DOCUMENTS

| | | | | |
|---|---|---|---|---|
| 2,480,178 | A * | 8/1949 | Zinberg | 362/621 |
| 4,642,736 | A * | 2/1987 | Masuzawa et al. | 362/621 |
| 5,914,760 | A * | 6/1999 | Daiku | 349/65 |
| 6,520,056 | B1 | 2/2003 | Nemeth et al. | |
| 7,190,425 | B2 | 3/2007 | Hong | |
| 7,268,485 | B2 | 9/2007 | Tyan et al. | |
| 7,324,278 | B2 * | 1/2008 | Kuo et al. | 359/460 |
| 7,798,698 | B2 * | 9/2010 | Segawa | 362/616 |
| 7,876,393 | B2 | 1/2011 | Tanabe | |
| 7,947,991 | B2 | 5/2011 | Wang et al. | |
| 8,089,583 | B2 * | 1/2012 | Li et al. | 349/65 |

(Continued)

FOREIGN PATENT DOCUMENTS

| | | |
|---|---|---|
| EP | 1736558 A1 | 12/2006 |
| EP | 2202447 A1 | 6/2010 |

(Continued)

OTHER PUBLICATIONS

International Search Report and Written Opinion for PCT/JP2012/001215 dated May 22, 2012.

(Continued)

*Primary Examiner* — Peggy Neils
(74) *Attorney, Agent, or Firm* — Pepper Hamilton LLP

(57) ABSTRACT

A lighting device includes a light guide structure. The light guide structure is arranged in tiers by a plurality of thin-film modules in which a portion of a first surface of each lower one of the plurality of light guide layers is covered by an upper one of the plurality of light guide layers to form an uncovered portion of the first surface. Each of the thin-film modules is configured to transmit light therein emitted from light emitting diodes (LEDs) to the uncovered portion and emit the light from the uncovered portion of the first surface thereof.

23 Claims, 16 Drawing Sheets

(56) References Cited

U.S. PATENT DOCUMENTS

| | | | |
|---|---|---|---|
| 8,434,909 B2* | 5/2013 | Nichol et al. | 362/296.01 |
| 2005/0104078 A1 | 5/2005 | Cheng et al. | |
| 2006/0109399 A1 | 5/2006 | Kubota et al. | |
| 2008/0205081 A1* | 8/2008 | Ijzerman et al. | 362/616 |
| 2009/0207629 A1 | 8/2009 | Fujiyama et al. | |
| 2010/0208490 A1 | 8/2010 | Tsuchiya et al. | |
| 2011/0002140 A1* | 1/2011 | Tsukahara et al. | 362/602 |
| 2011/0149594 A1* | 6/2011 | Terajima et al. | 362/606 |
| 2011/0242847 A1 | 10/2011 | Greener et al. | |
| 2012/0002137 A1 | 1/2012 | Saito et al. | |

FOREIGN PATENT DOCUMENTS

| | | |
|---|---|---|
| EP | 2287932 A2 | 2/2011 |
| EP | 2374608 A2 | 10/2011 |
| JP | 05205511 | 8/1993 |
| JP | H05205511 A | 8/1993 |
| JP | H05205512 A | 8/1993 |
| JP | 3748101 B2 | 2/2006 |
| JP | 2006145884 A | 6/2006 |
| JP | 2006237264 A | 9/2006 |
| JP | 2006247531 A | 9/2006 |
| JP | 2007507851 A | 3/2007 |
| JP | 2007088248 A | 4/2007 |
| JP | 2007206375 A | 8/2007 |
| JP | 2007206398 A | 8/2007 |
| JP | 2008130279 A | 6/2008 |
| JP | 2008235264 A | 10/2008 |
| JP | 2009099271 A | 5/2009 |
| JP | 2009105025 A | 5/2009 |
| JP | 2009170325 A | 7/2009 |
| JP | 2009193892 A | 8/2009 |
| JP | 2009301972 A | 12/2009 |
| JP | 2010013740 A | 1/2010 |
| JP | 2010140721 A | 6/2010 |
| JP | 2011020200 A | 2/2011 |
| JP | 2011044610 A | 3/2011 |
| JP | 2011222513 A | 11/2011 |
| JP | 2012013969 A | 1/2012 |
| WO | WO 2005/056848 A1 | 6/2005 |
| WO | WO 2006/093168 A1 | 9/2006 |
| WO | WO 2006/109399 A1 | 10/2006 |
| WO | WO2009048053 A1 | 4/2009 |
| WO | WO2010067892 A1 | 6/2010 |
| WO | WO2012011327 A1 | 1/2012 |
| WO | WO2012020669 A1 | 2/2012 |

OTHER PUBLICATIONS

"Beam Expander," Sigma Cybertech Corporation, accessed at http://web.archive.org/web/20100412234743/http://www.sigma-cybertech.co.jp/set_opt/hikiai/OPTOutline/LENSES3/1.htm, accessed on Sep. 3, 2014, pp. 1-2.

"CYTOP: Characteristics," Ashahi Glass, accessed at http://web.archive.org/web/20130215071842/http://www.age.com/english/chemicals/shinsei/cytop/optical.html, accessed on Sep. 3, 2014, pp. 1-3.

"High Reflection Silver Plating and Electromagnetic Compatibility in Ceramic MID," Panasonic Electric Works Technical Report, vol. 56, No. 3, accessed on Sep. 3, 2014, pp. 43-49 (English Abstract).

"High Refractive Index Materials," accessed at http://web.archive.org/web/20120319175611/http://www.jsr.co.jp/jsr_e/pd/op_a02.shtml, accessed on Sep. 2, 2014, p. 1.

"Light-emitting element/light-emitting diode (LED)," Alpha-One Electronics Ltd., accessed at http://web.archive.org/web/20120221083021/http://www.alpha1-eg.com/led/index.html, accessed on Sep. 3, 2014, pp. 1-5.

"Optical Materials," Product information of JSR Corporation, accessed at http://web.archive.org/web/20111223170012/http://www.jsr.co.jp/jsr_e/pd/op_index02.shtml, accessed on Sep. 3, 2014, pp. 1-2.

"Particle shape control," accessed at http://web.archive.org/web/20110903082056/http://www.tech-p.com/technology/form.html, accessed on Sep. 3, 2014, pp. 1-4.

"Roll Coater—Flash-Off Dryer," the Union Tool Corporation, accessed at http://web.archive.org/web/20110726191258/http://www.uniontoolcorp.com/pages/Roller_Coater_Flash-Off_Dryer_PB16512.html, accessed on Sep. 3, 2014, pp. 1-2.

"Zeonor basic properties," Zeon Corporation, pp. 8 (2008).

Kim, J. K., et al., "Strongly Enhanced Phosphor Efficiency in GaInN White Light-Emitting Diodes Using Remote Phosphor Configuration and Diffused Reflector Cup." Japanese Journal of Applied Physics, vol. 44, No. 21, pp. L649-L651 (2005).

Nagao, D., et al., "Fabrication of highly refractive, transparent BaTiO3/poly(methyl methacrylate) composite films with high permittivites," Polymer International, vol. 60, No. 8, pp. 1180-1184 (Mar. 24, 2011).

Ogawa, G., et al., "Perfluoro Transparent Resin 'Cytop'—Some Physical Properties and Kinetic Studies on Radical Polymerization Reaction-," Reports Res. Lab, Asahi Glass Co., Ltd., vol. 55, pp. 47-51 (2005).

* cited by examiner

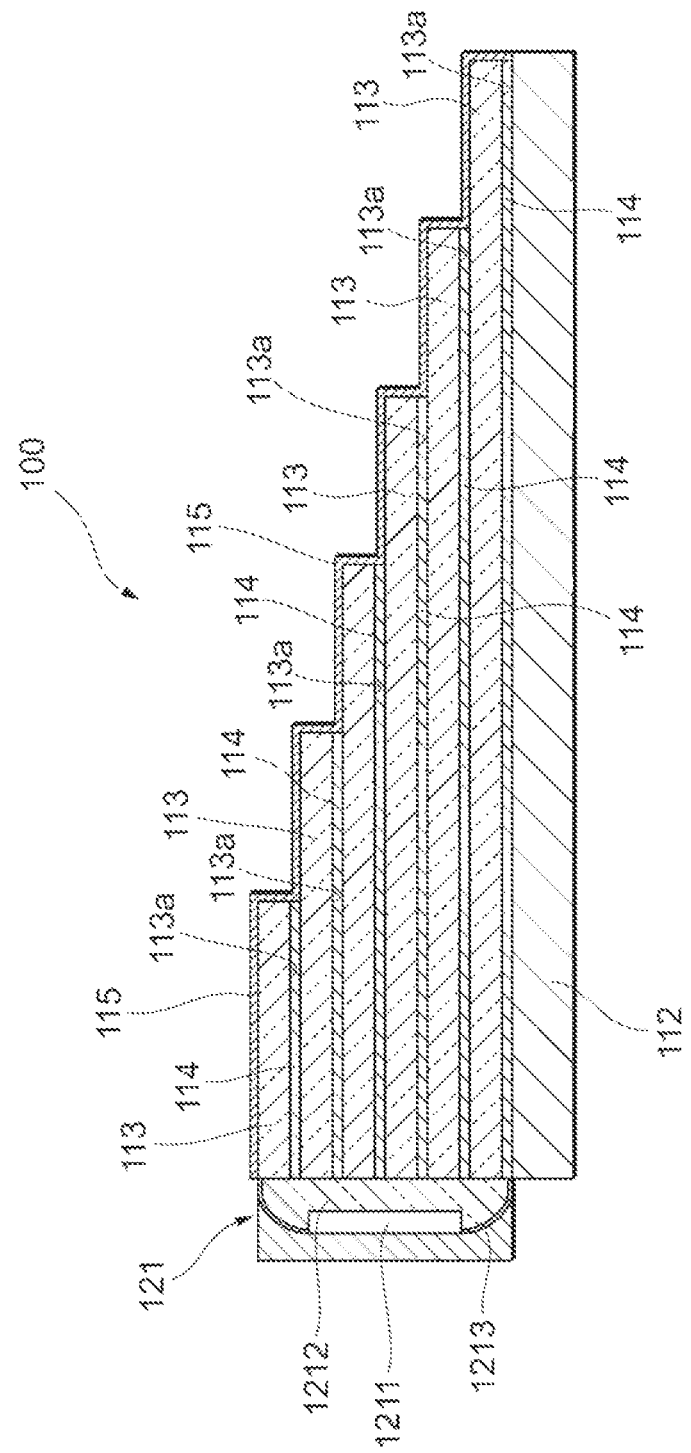

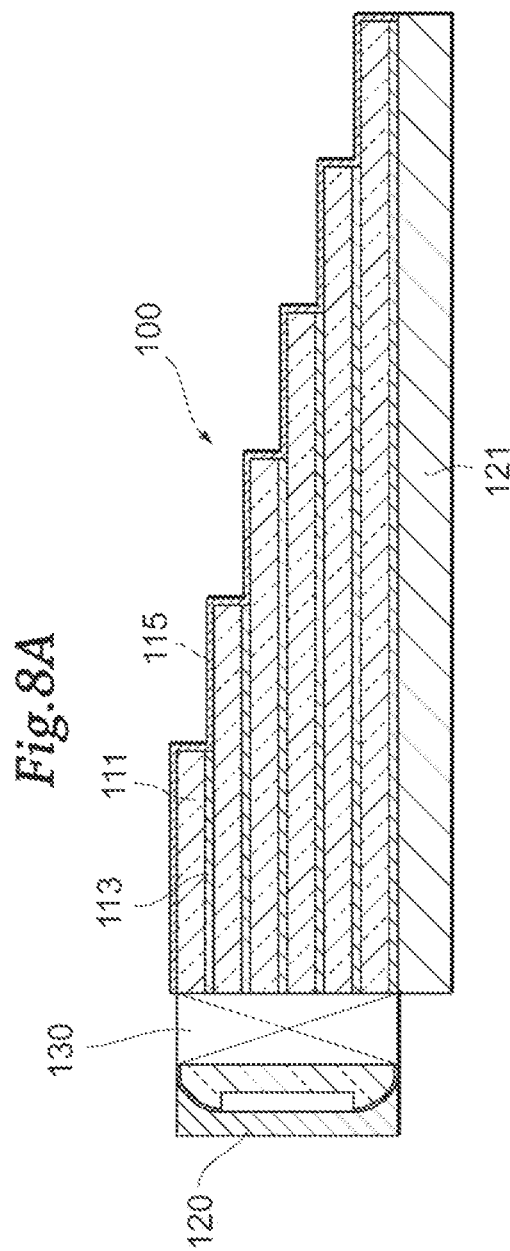

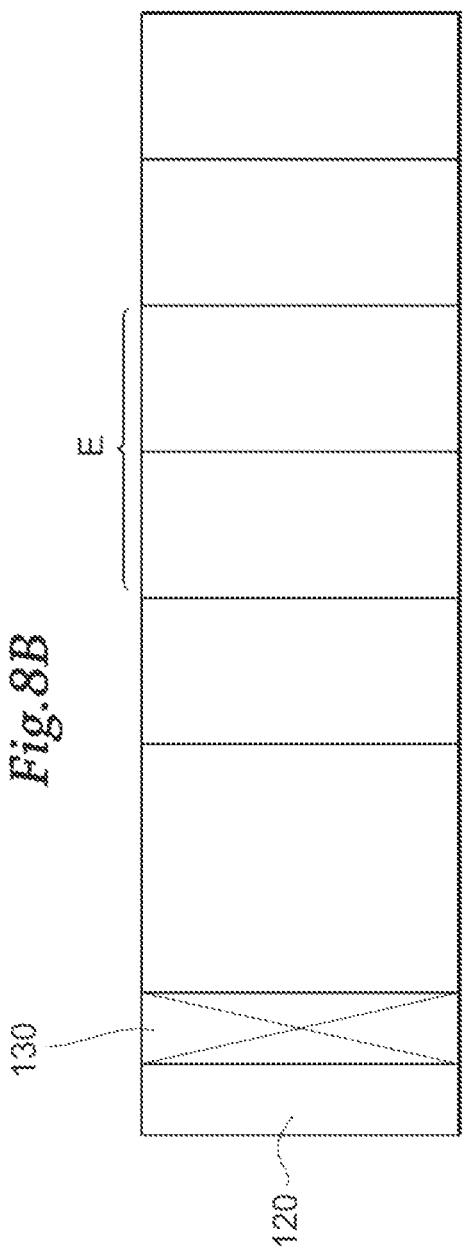

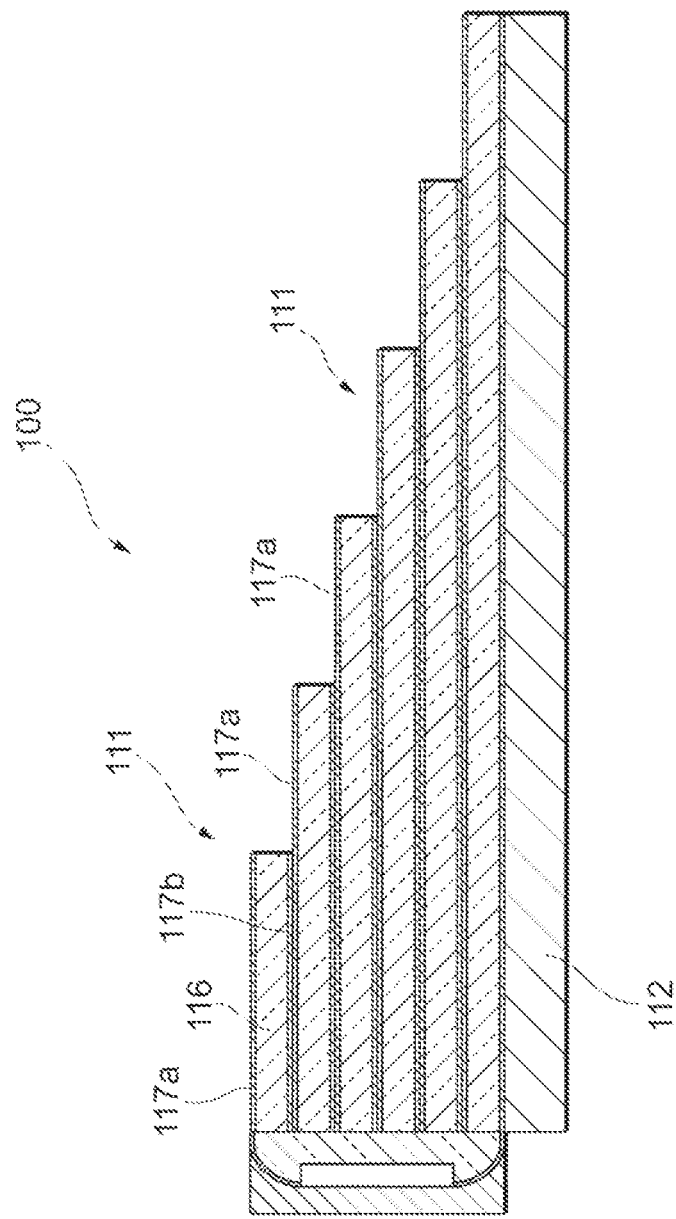

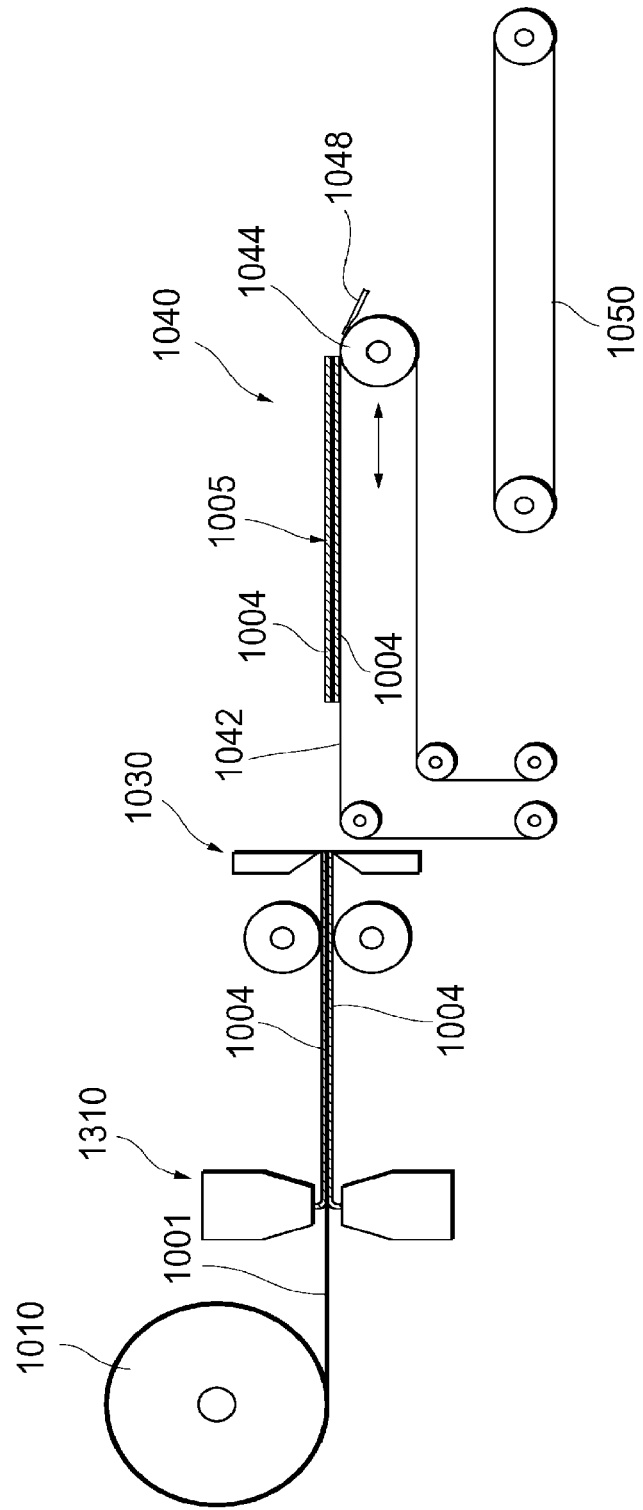

_US 8,956,038 B2_

LIGHTING DEVICE HAVING A LIGHT GUIDE STRUCTURE

CLAIM OF PRIORITY

This application is a U.S. national stage filing under 35 U.S.C. §371 of International Application No. PCT/JP2012/001215 filed Feb. 22, 2012 entitled "Lighting Device having a Light Guide Structure," the disclosure of which is incorporated by reference in its entirety.

TECHNICAL FIELD

The present disclosure relates generally to lighting devices, and more particularly to a lighting device with a light guide structure capable of transmitting light in a planar direction.

BACKGROUND

Light-emitting diodes (LEDs) have attracted growing attention in recent years as lighting sources alternative to conventional incandescent light bulbs and fluorescent lamps due to their characteristics of providing low power consumption, long-life operation, high reliability, etc. An LED, per se, serves as a small light source, and thus surface light source technology is required to evenly illuminate a broader area in order to allow it to be used for lighting. Backlighting is a well-known example of a surface light source technology. Backlighting typically requires, in part, a lens or prism which is manufactured using a complex optical design, as well as a light guide panel on which reflective dots are formed. In the course of the backlighting, light emitted from LEDs enters into a side edge of the light guide panel. The light emitted into the light guide panel travels throughout the light guide panel by constantly bouncing from the panel's boundary surfaces by a process of total internal reflection, while diffusing part of the traveling light at light diffusion spots (i.e., reflective dots), thereby allowing the light to be emitted from the front surface. Thus, the entire area of the light guide panel can be illuminated by the light emitted from the LEDs.

However, manufacturing such a conventional light guide panel requires particular processes, namely: designing optical elements depending on the dimension and/or shape of the panel, providing a precise molding, and then stamping the molding, and, accordingly, there is a lack of versatility in such manufacturing. Further, it is highly difficult to ensure design accuracy and homogeneity, and the cost of manufacturing necessarily increases thereby.

BRIEF DESCRIPTION OF DRAWINGS

FIG. 2 is a schematic cross-sectional view showing an example of a lighting device arranged in accordance with the present disclosure.

FIG. 8A is a cross-sectional view showing an example of a lighting device arranged in accordance with the present disclosure.

FIG. 8B is a top view showing an example of art adjusted illumination area of a lighting device arranged in accordance with the present disclosure.

FIG. 11 is a cross-sectional view showing an example of another lighting device arranged in accordance with the present disclosure.

FIG. 13 is schematic illustrations showing an example of a part of a manufacturing method that is arranged for a lighting device in accordance with the present disclosure.

DETAILED DESCRIPTION

Figure 1:
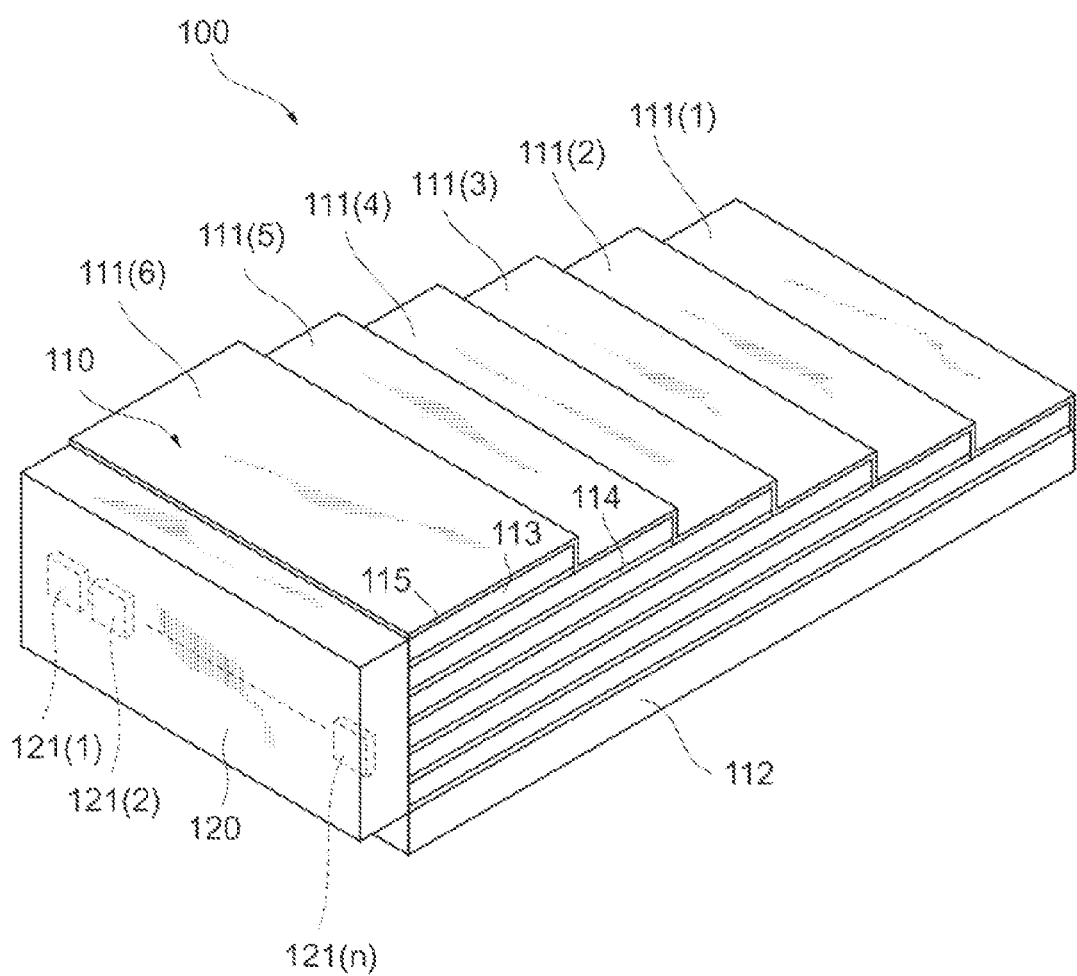
FIG. 1 is a schematic perspective view showing an example of a lighting device arranged in accordance with the present disclosure.

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure describes techniques, devices, apparatuses, systems, and methods for light illumination including, but not limited to, emitting light by at least one light emitting device into a light guide structure arranged in tiers, propagating the light within the light guide structure, and emitting the light from portions of the light guide structure.

FIG. 1 is a schematic perspective view showing an example of a lighting device arranged in accordance with the present disclosure. Referring to FIG. 1, the lighting device 100 may include a tiered structure 110 and an illuminator board 120 positioned at one end of the tiered structure 110. The longitudinal length of the illuminator board 120 may accord to a large extent with the length in a width direction of the tiered structure 110.

As a non-limiting example, the tiered structure 110 may include a plurality of light guide layers 111(1)-111(n) (hereinafter, as the case may be, collectively referred to as the "plurality of light guide layers 111") arranged in tiers. The tired structure 110 in this non-limiting example has a six-layered structure. Specifically, a portion of a first surface of each lower one of the plurality of light guide layers 111 is covered by an upper one of the plurality of light guide layers 111 to form an uncovered portion of the first surface of the lower one, so that the top of the tiered structure 110 is in the form of a tiered surface. Further, edges of one ends of the plurality of light guide layers may be arranged in a plane to form an acceptance surface of the tiered structure 110 to which the illuminator board 120 is optically coupled (see also FIG. 2). Each of the plurality of light guide layers 111 may be configured to include a light guiding section to transmit or propagate light from the illuminator board 120 in a planar direction and a light emitting section to emit the light so transmitted or propagated, as will be discussed with reference to FIG. 2. The number of the light guide layers 111 may be determined by the area of illumination which is required. A non-limiting example of the number of the light guide layers 111 may be greater than or equal to 2 layers and less than or equal to about 100 layers. A specific example of the number is between about 10 and layers. Specific examples of the number of layers include 2 layers, 5 layers, 10 layers, 20 layers, 30 layers, 40 layers, 50 layers, 60 layers, 70 layers, 80 layers, 90 layers, 100 layers, and ranges between any two of these values.

Further, the tiered structure 110 may include a substrate 112 to support the plurality of light guide layers 111 thereon. The substrate 112 may be made of a hard resin material, but is not limited to being made of such a resin material. In some examples, the substrate 112 may be transparent. A non-limiting example of the thickness of the substrate 112 may be greater than several micrometers and about 70 micrometers or less. Specific examples of the thickness are about 5 micrometers, about 10 micrometers, about 20 micrometers, about 30 micrometers, about 40 micrometers, about 50 micrometers, about 60 micrometers, and about 70 micrometers, and ranges between any two of these values. Alternatively, a thickness of the substrate 112 of 70 micrometers or more may be applicable.

The illuminator board 120 may include a plurality of light emitting devices 121(1)-121(n) (hereinafter, as the case may be, collectively referred to as the "plurality of light emitting devices 121"). The plurality of light emitting devices 121 may be arranged in arrays in the width direction of the tiered structure 110 in order to provide substantially planar light to the tiered structure 110. The plurality of light emitting devices 121 may be, for example, but are not limited to, light-emitting diodes (LEDs), each of which is capable of emitting white light or pseudo-white light. The number of the light emitting devices 121 may depend on the length in the width direction of the tiered structure 110. As one non-limiting example, the number of the light emitting devices 121 may be between 1 and about 100. A specific example of the number is between about 10 and about 30. Specific examples of the number of devices include 1 device, 2 devices, 5 devices, 10 devices, 20 devices, 30 devices, 40 devices, 50 devices, 60 devices, 70 devices, 80 devices, 90 devices, 100 devices, and ranges between any two of these values. The plurality of light emitting devices 121 may be driven by a driver circuit (not shown). The illuminator board 120 may be configured by a cold-cathode tube.

Although, in this example, the light emitting devices 121 may emit visible light may, one or more light emitting devices for emitting invisible light may be applicable. As one non-limiting example, infrared or ultraviolet LED may be used for the light emitting devices. In other examples, the devices may emit two or more types of light, such as visible light and infrared light, or visible light and ultraviolet light.

FIG. 2 is a schematic cross-sectional view showing an example of a lighting device arranged in accordance with the present disclosure. As shown in FIG. 2, each of the plurality of light guide layers 111 of the tiered structure 110 may include, for example, a transparent layer 113 and a reflective layer 114. Instead of the transparent layers 113, any or all of the plurality of light guide layers 111 may include translucent layers. Further, the plurality of light guide layers 111 may include a diffusion layer 115 arranged on the uncovered portions of the upper surfaces thereof. Although the diffusion layer 115 is formed in a seamless manner in this non-limiting example, the diffusion layer 115 may be segmented with respect to each of the plurality of light guide layers 111.

The transparent layer 113 may be made of glass such as silicon dioxide, silica, fluorozirconate, or phosphate glass, or plastic such as fluorinated polymer, polymethyl-methacrylate, or polycarbonate, but is not limited to being made of such glass or plastic. A non-limiting example of the thickness of the transparent layer 113 may be greater than about one micrometer and about 10 micrometers or less. Specific examples of the thickness are about 1 micrometer, about 2 micrometers, about 3 micrometers, about 4 micrometers, about 5 micrometers, about 6 micrometers, about 7 micrometers, about 8 micrometers, about 9 micrometers and about 10 micrometers, and ranges between any two of these values. Alternatively, a thickness of the transparent layer 113 of 1 micrometer or less, or 10 or more micrometers may be applicable. As a non-limiting example, an edge of the distal end opposite to the one end of the transparent layer 113 may be chamfered (see also FIG. 5).

The reflective layer 114 is configured to reflect light incident thereon. As a non-limiting example, the reflective layer 114 may be arranged on a lower surface 113a of the transparent layer 113. Namely, the reflective layer 114 of an upper one of the plurality of light guide layers 111 may be in contact with a portion of an upper surface of a lower one of the plurality of light guide layers 111. Thus, a section of the light guide layer 111 where the reflective layers 114 are arranged to face each other functions as the light guiding section which allows light to travel in a manner of successive reflections. The reflective layer 114 may be made of, but is not limited to being made of, aluminum, silver, tin alloy, or zinc alloy. As a non-limiting example, the reflective layer 114 may be formed by a sputtering process. A non-limiting example of the thickness of the reflective layer 114 may be about one micrometer. Typically, the thickness of the reflective layer 114 is relatively thinner than that of the transparent layer 113. Specific examples of the thickness are about 0.8 micrometers, about 0.9 micrometers, about 1 micrometer, about 1.1 micrometers, about 1.2 micrometers, about 1.3 micrometers, about 1.4 micrometers, about 1.5 micrometers, about 1.6 micrometers and about 1.7 micrometers, and ranges between any two of these values.

The diffusion layer 115 is configured to diffuse and emit the light which travels in the transparent layer 113. Thus, the section of the light guide layer 111 where the reflective layer 114 is arranged functions as the light emitting section. The diffusion layer 115 may be made of a resin, such as, but not limited to, polycarbonate, polyester, or polyolefin, on which a binder resin coating containing acrylic or styrene microparticles is applied. The microparticles may allow the light to be uniformly diffused. As another non-limiting example, the diffusion layer 115 may be formed by a resin containing acrylic or styrene microparticles therein. A non-limiting example of the thickness of the diffusion layer 115 may be greater than about one micrometer and about several micrometers or less. Specific examples of the thickness are about 0.8 micrometers, about 0.9 micrometers, about 1 micrometer, about 1.1 micrometers, about 1.2 micrometers, about 1.3 micrometers, about 1.4 micrometers, about 1.5 micrometers, about 1.6 micrometers and about 1.7 micrometers, and ranges between any two of these values.

The light emitting devices 121 are configured to emit light into the acceptance surface of the tiered structure 110. As a non-limiting example, each of the light emitting devices 121 may be configured in the form of a package in which a light emitting diode chip 1211 is packaged in a resin material 1212. As another non-limiting example, the resin material 1212 may contain phosphor particles. Phosphor particles may be selected depending on a color of light to be emitted by the light emitting diode chip 1211. For example, the phosphor particles which are capable of emitting a specific wavelength (e.g., yellow light) may be selected for the light emitting diode chip 1211 which is capable of emitting a wavelength complementary to the specific wavelength (e.g., blue light), thereby allowing the light emitting device 121 to emit pseudo-white light. Each of the light emitting devices 121 may also include a reflector 1213 configured to efficiently output the emitted light in a forward direction. The light emitting diode chip 1211 may have a flip-chip structure in which electrodes are formed on an epitaxy surface thereof. In the flip-chip structure, the surface opposite to the epitaxy surface is capable of emitting light. As another non-limiting example, a face-up structure of the light emitting diode chip may be applicable.

Figure 3A:
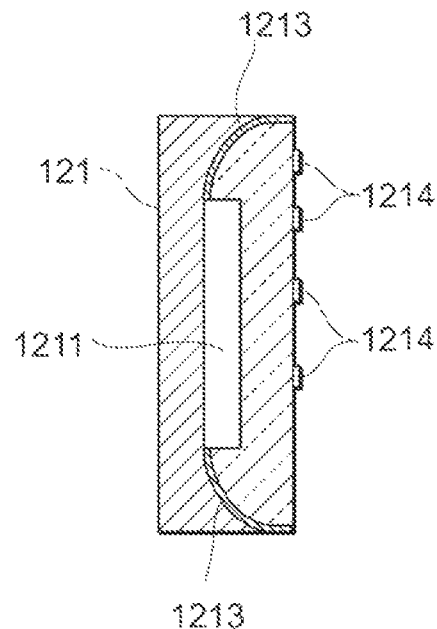
FIG. 3A is a schematic cross-sectional view showing an example of a light emitting device for a lighting device arranged in accordance with the present disclosure.
Figure 3B:
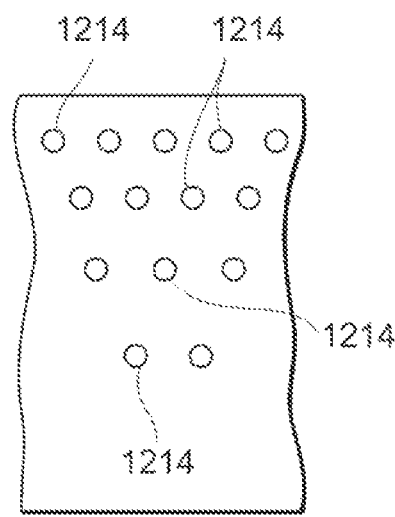
FIG. 3B is a partial schematic front view showing the light emitting device shown in FIG. 3A.
Figure 4:
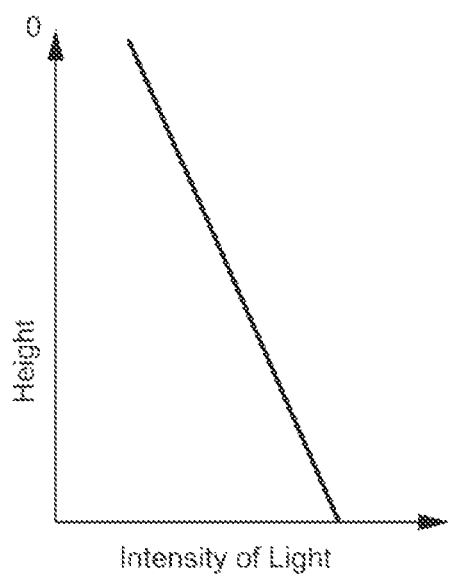
FIG. 4 is an example graph showing light intensity with respect to positions in a height direction of a light emitting device for a lighting device arranged in accordance with the present disclosure.

Further, each of the light emitting devices 121 may include a light intensity adjuster. As a non-limiting example, the light intensity adjuster may include reflective fragments 1214 geometrically or randomly arranged on the front surface of the package as shown in FIGS. 3A and 3B. As another non-limiting example, the reflective fragments 1214 may be white ink-dot patterns formed by screen printing. As another non-limiting example, the reflective fragments 1214 may be, but are not limited to being, a thin-film metal, such as aluminum, silver, nickel, chromium, tin, or zinc, or an alloy composed of at least one of these materials. Such reflective fragments 1214 may shield, in part, the relevant light guide layers 111 from the light emitted from the light emitting diode chip 1211, thereby adjusting the intensity of the light incident on the relevant light guide layers 111. The density distribution of the reflective fragments 1214 may vary gradationally in the height direction of the light emitting device 121. In the present disclosure, the lower the tier level of the light guide layers 111 is, the longer the distance of the light traveled through that light guide layer 111, and, accordingly, the higher the intensity of light which is incident thereon is required. Thus, the lower the reflective fragments 1214 are positioned, the higher the density distribution of the reflective fragments 1214 becomes. In other words, the reflective fragments 1214 may be arranged so that as the one end portion becomes more distant from the uncovered portion of each one of the plurality of light guide layers 111, the intensity of the light which is incident thereon becomes higher as shown in FIG. 4.

Figure 3C:
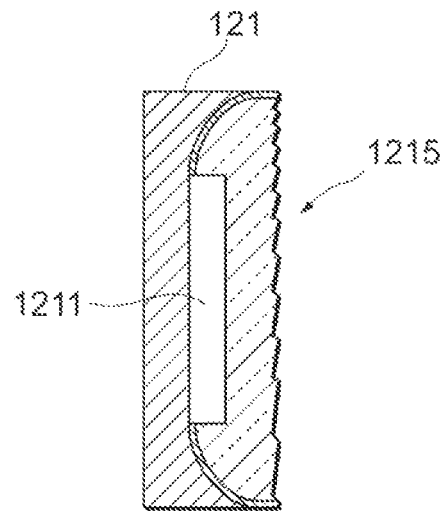
FIG. 3C is a schematic cross-sectional view showing an example of a light emitting device for a lighting device arranged in accordance with the present disclosure.
Figure 3D:
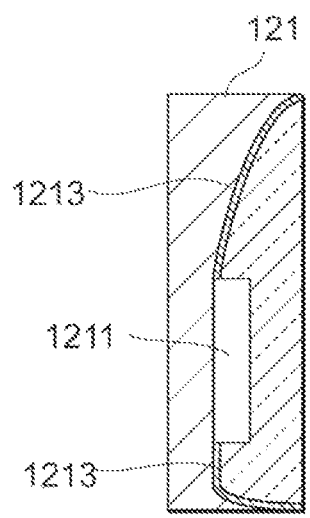
FIG. 3D is a schematic cross-sectional view showing an example of a light emitting device for a lighting device arranged in accordance with the present disclosure.

As a non-limiting example, the light intensity adjuster may be configured by a prism-like lens 1215 formed at the front surface of the package as shown in FIG. 3C. A surface of the prism-like lens 1215 may be serrated in order to diffuse light so that an upper portion of the prism-like lens 1215 can diffuse a relatively large amount of light. FIG. 3D provides an alternative, non-limiting, example of showing a light intensity adjuster of the lighting device arranged in accordance with the present disclosure. In this example, the light emitting diode chip 1211 may be positioned at a lower portion of the package in order to efficiently provide a relatively large amount of light to the lower light guide layers 111. Although not shown in FIG. 3D, the light emitting diode chip 1211 may be tilted so that a light axis of the light emitting diode chip 1211 may be directed upward. The position and elevation angle of the light axis of the light emitting diode chip 1211 may be selected depending on the distribution of the light intensity.

In some embodiments, the reflective layer 114 may be a dielectric multilayer. The dielectric multilayer is known as a layer capable of exerting a high level of light reflectivity with respect to a specific wavelength. The dielectric multilayer may be, for example, but not limited to made up of about 20-30 layers, the thickness of each of which is about between several nanometers and 100 nanometers. The dielectric multilayer may be formed by chemical vapor deposition. As a non-limiting embodiment, the dielectric multilayer may be adapted for highly reflecting light of a specific wavelength (e.g., blue light). Thus, the dielectric multilayer may efficiently reflect light traveling within the transparent layer 113, and thereby efficiently propagate the light. Further, the diffusion layer 115 may be configured to contain phosphor particles capable of emitting a wavelength complementary to the specific wavelength (e.g. yellow light). SiALON phosphor is known as a high efficiency phosphor. It should be anticipated that phosphors may be selected depending on the color of light to be emitted by the light emitting diode chip 1211. By this method, pseudo-white light can be obtained. Moreover, in terms of their color rendering properties, phosphor particles capable of emitting another color light may be contained.

Figure 5:
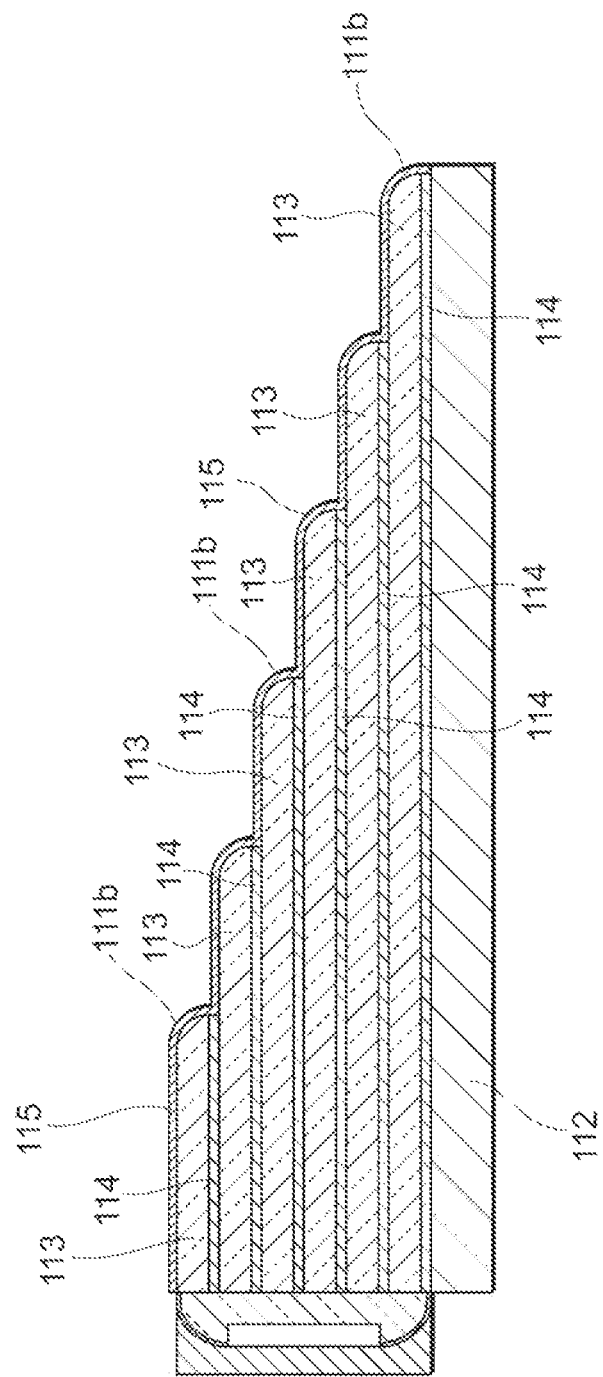
FIG. 5 is a cross-sectional view showing an example of a lighting device arranged in accordance with the present disclosure.

FIG. 5 is a cross-sectional view showing another non-limiting example of a lighting device arranged in accordance with the present disclosure. Referring to FIG. 5, an edge of the opposite end to the one end of each of the light guide layers 111 may be chamfered to have a curved portion 111b. It would be understood that the diffusion layer 115 may reliably be applied on the chamfered edge of the transparent layer 113. Further, such a chamfered edge may obscure seams between the light guide layers 111.

Figure 6:
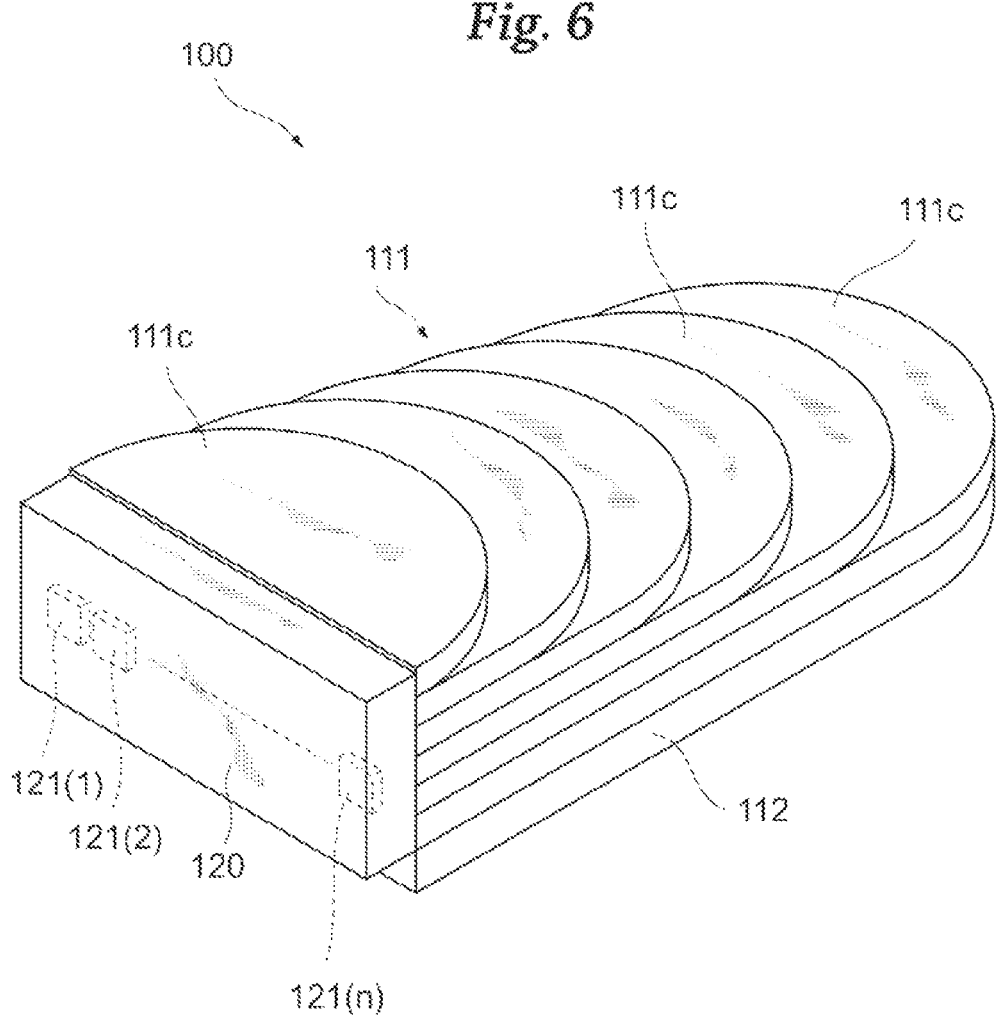
FIG. 6 is a schematic perspective view showing an example of a lighting device arranged in accordance with the present disclosure.

The planar shape of the plurality of light guide layers 111 may include, but not be limited to being rectangular, and thus various shapes thereof may be designed. As one non-limiting example, the planar shape of the plurality of light guide layers 111 may be a polygon such as a triangle or trapezoid. Alternatively, the planar shape of the plurality of layers 111 may be a "U" shape. FIG. 6 is a schematic perspective view showing another example of a lighting device arranged in accordance with the present disclosure. In this example, each of the plurality of light guide layers 111 may include an arcuate portion 111b at the distal end thereof. Further, the distal end of each of the plurality of light guide layers 111 may have an angle portion. It should be anticipated that the plurality of light guide layers 111 may not be required to have a similar shape or length. At least one of the plurality of light guide layers 111 may have a different shape or length from the others. The tiered surface of the tiered structure 110 may be covered by the diffusion layer 115 as discussed above.

Figure 7:
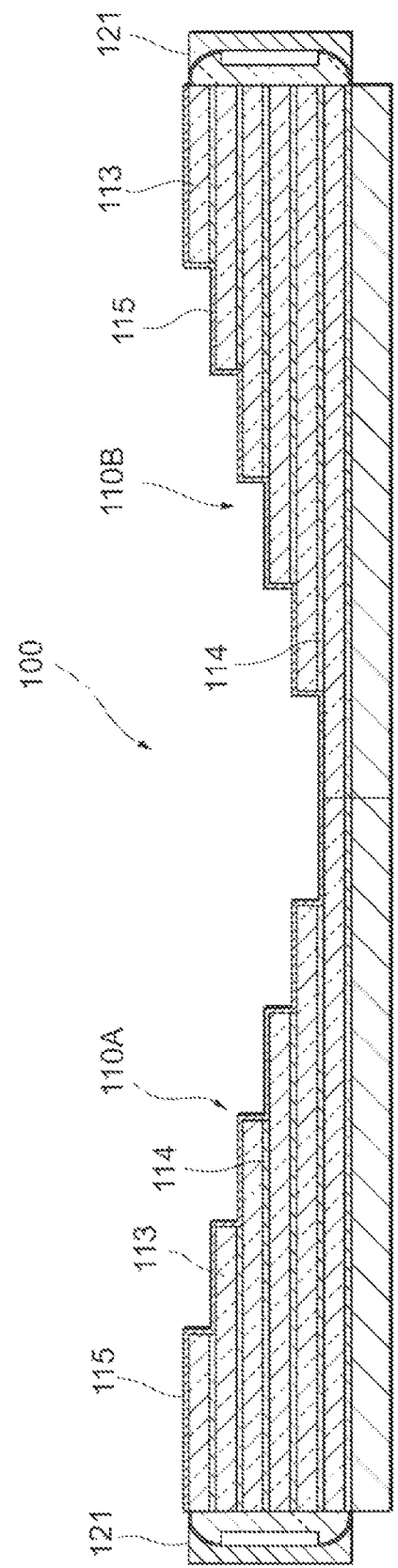
FIG. 7 is a cross-sectional view showing an example of a lighting device arranged in accordance with the present disclosure.

FIG. 7 is a cross-sectional view showing another non-limiting example of a lighting device arranged in accordance with the present disclosure. In this example, the lighting device 100 may include a first tiered structure 110A and a second tiered structure 110B which are joined together at the distal portion thereof. This configuration may allow the lighting device 100 to provide a wider illumination area. Further, each of the tiered structures 110A and 110B may be controlled independently to illuminate an intended part of the illumination area.

FIG. 8A is a cross-sectional view showing another non-limiting example of a lighting device arranged in accordance with the present disclosure. Referring to FIG. 8A, the lighting device 100 may include a beam expander 130 arranged between the tiered structure 110 and the light emitting device 120. The beam expander 130 may be configured to adjust the dimension of light beams emitted from the light emitting device 120. The beam expander 130 may include, optical elements, such as, but not limited to, lenses or slits (not shown). The dimension of the light beams may be adjusted in a manner of adjusting a distance between the light emitting devices 121 and the optical elements of the beam expander 130. Alternatively, the distance between the optical elements of the beam expander 130 may be adjusted. Adjusting such a distance may be performed by adjustable screws (not shown). When the dimension of the light beams becomes smaller, an area of the acceptance surface of the tiered structure 110 where the light is incident becomes smaller. Accordingly, as specific ones of the light guide layers 111 can receive a sufficient amount of the light, the light emitting sections E of the specific ones of the light guide layers 111 can be illuminated as shown in FIG. 8B.

Figure 9:
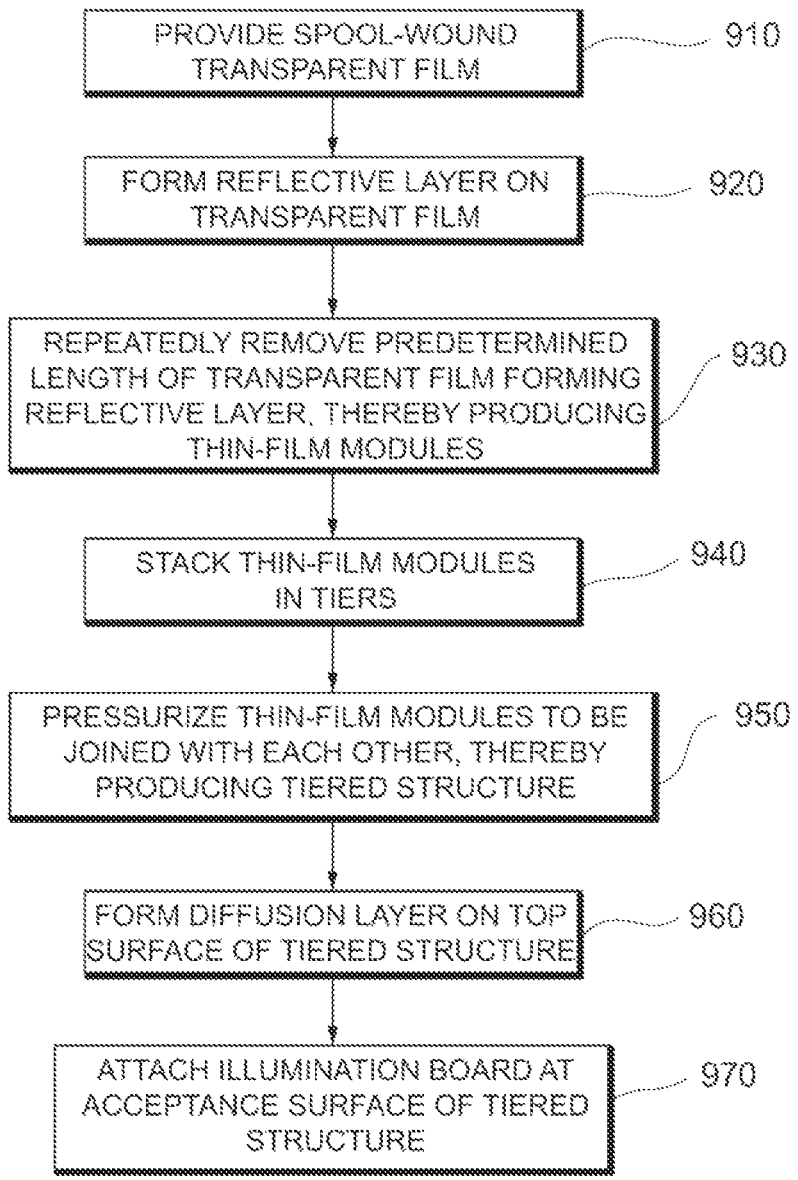
FIG. 9 is a flow chart showing an example of a manufacturing method that is arranged for a lighting device in accordance with the present disclosure.

FIG. 9 is a flow chart showing an example of a manufacturing method that is arranged for a lighting device in accordance with the present disclosure. As a non-limiting example, a roll-to-roll process may be adapted for manufacturing the lighting device 100, using an already-existing product line.

Referring to FIG. 9, in an operation 910, a transparent film wound on a spool is provided at a predetermined position. The transparent film is a material which serves as the transparent layer 113 discussed above. In an operation 920, the transparent film may be rolled out from the spool, and a reflective film (i.e., reflective layer 114) may be continuously formed on the transparent film by, for example, sputtering. Alternatively, chemical vapor deposition (CVD) may also be applicable. In an operation 930, a predetermined length of the transparent film forming the reflective layer 114 thereon may be removed by, for example, a cutter, a scissor, or a laser. The result thereof is referred to hereafter as a thin-film module. In an operation 940, once the thin-film module is removed, it is stacked in such an order as to be arranged in tiers. A plurality of thin-film modules stacked in tiers of different lengths may be provided by repeating the operations 930 and 940.

Figure 10A:
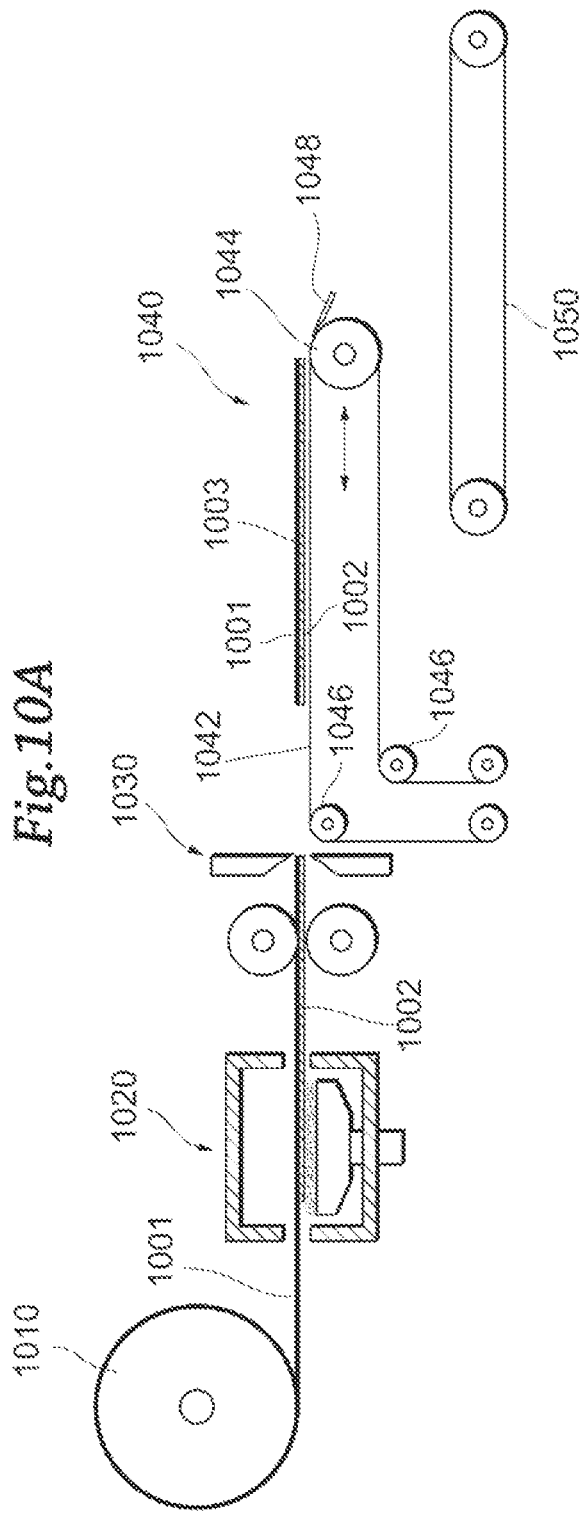
FIG. 10A is a schematic illustration showing an example of a part of a manufacturing method that is arranged for a lighting device in accordance with the present disclosure.
Figure 10B:
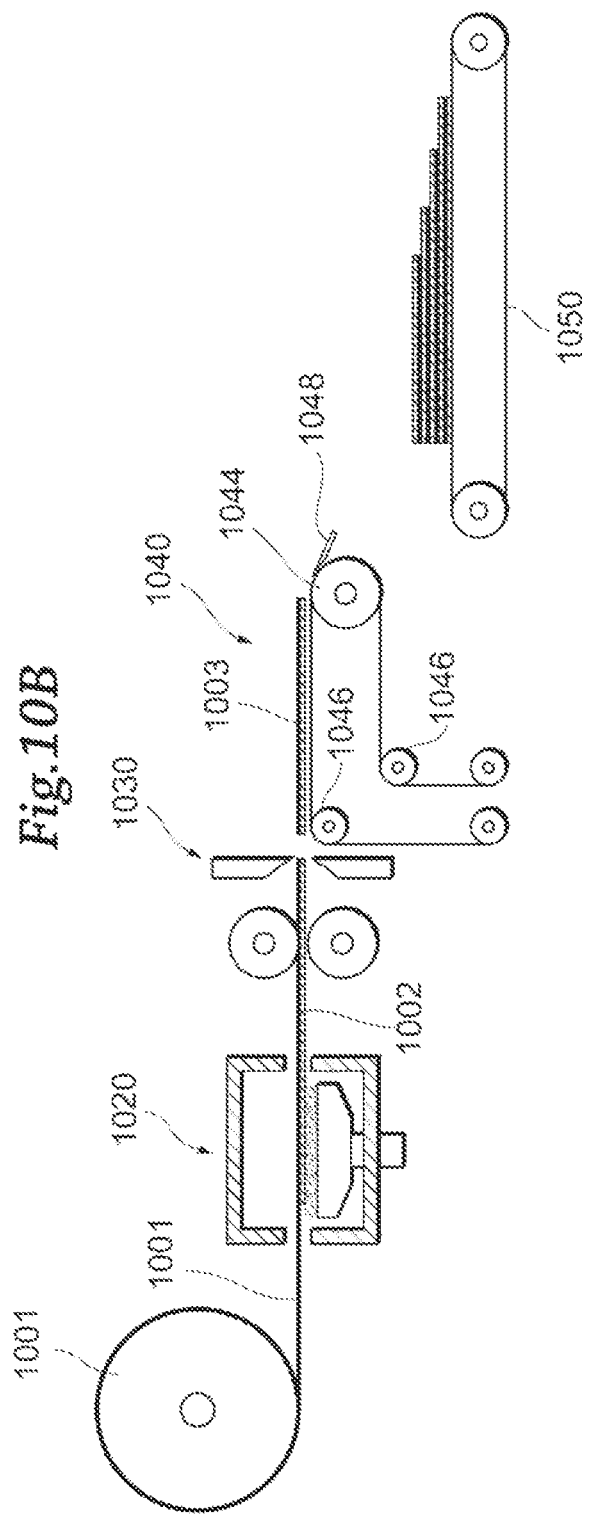
FIG. 10B is a schematic illustration showing an example of a part of a manufacturing method that is arranged for a lighting device in accordance with the present disclosure.

FIGS. 10A and 10B are schematic illustrations showing non-limiting examples of a part of a manufacturing method that is arranged for a lighting device in accordance with the present disclosure. More specifically, FIGS. 10A and 10B illustrate examples of processes of producing a plurality of thin-film modules arranged in tiers as discussed in FIG. 9.

Referring to FIG. 10A, a sputtering apparatus 1020 may be arranged on a traveling path of a transparent film 1001 wound on a spool 1010. The transparent film 1001 rolled out from the spool 1010 may thread onto the sputtering apparatus 1020, and a reflective layer 1002 may be formed on the transparent film 1001 by way of sputtering a target material with energetic particles in the sputtering apparatus 1020. The transparent film 1001 forming the reflective layer 1002 thereon may be removed at a predetermined length by, for example, a cutter 1030, and thereby a thin-film module 1003 may be obtained. The thin-film module 1003 may be placed on, and conveyed by a conveyor belt 1042 of a stacking apparatus 1040. The stacking apparatus 1040 may include a head pulley 1044 configured to be displaced back and forth in a traveling direction of the conveyor belt 1042 and rear pulleys 1046. The stacking apparatus 1040 performs displacement control of the head pulley 1044 in order to stack up the thin-film modules 1003 on a target place above a conveyor 1050. As a non-limiting example, the substrate 112 may be placed on the conveyor 1050 first, with the head pulley 1044 then being displaced forward to a predetermined position over the conveyor 1050, while the conveyor belt 1042 is travelling by rotation of the pulleys 1034 so as to convey the thin-film module 1003. When the head pulley 1044 reaches the predetermined position, the head pulley 1044 is next displaced in a backward direction, while the conveyor belt 1042 is continuously travelling. In doing so, the thin-film module 1003 slides out from the conveyor belt 1042, being guided by a guide plate 1048, and thereby the thin-film modules 1003 are stacked up on the target place. By way of repeating the above steps. The stacking apparatus 1040 may stack up the thin-film modules 1003 in tiers on the substrate 112 as shown in FIG. 10B.

Referring back to FIG. 9, in an operation 950, the thin-film modules stacked in tiers may be pressurized by heated pressure rollers to be joined to each other. The result thereof may be referred to as a semi-finished tiered structure. The heated pressure rollers may be made of an elastic material so as to be able to meet the tiered surface of the semifinished tiered structure. By adopting the above heated pressure rolling process, a product line may be simplified, and allow series production. In an operation 960, the semifinished tiered structure may be coated by the diffusion layer 115 by, for example, slit coating or roll coating. A well-known coating apparatus and method may be used. After the pressurization, a rear portion of the semifinished tiered structure forming the diffusion layer 115 thereon may be trimmed in order to establish an acceptance surface to receive light. As a result, the tiered structure 110 may be obtained. Lastly, in an operation 970, the illumination board 120 may be attached to the acceptance surface of the tiered structure.

FIG. 11 is a cross-sectional view showing another non-limiting example of a lighting device arranged in accordance with the present disclosure. In this example, each of the plurality of light guide layers 111 may be configured by two types of transparent layers which are different in terms of their refractive indices.

Specifically, each of the plurality of light guide layers 111 may include a core layer 116 and clad layers 117a and 117b arranged on both surfaces of the core layer 116 to face each other.

As a non-limiting example, the core layer 116 may be made of, but is not limited to being made of, glass such as silicon dioxide, silica, fluorozirconate, or phosphate glass, or plastic such as fluorinated polymer polymethyl-methacrylate, or polycarbonate. As a non-limiting example, the core layer 116 may be a transparent film. A non-limiting example of the thickness of the core layer 116 may be greater than about 1 micrometer and about 10 micrometers or less. Specific examples of the thickness are about 1 micrometer, about 2 micrometers, about 3 micrometers, about 4 micrometers, about 5 micrometers, about 6 micrometers, about 7 micrometers, about 8 micrometers, about 9 micrometers and about 10 micrometers, and ranges between any two of these values. Alternatively, a thickness of the core layer 116 of 1 micrometer or less, or 10 micrometers or more may be applicable.

Likewise, the clad layers 117a and 117b may be made of, but are not limited to being made of, glass such as silicon dioxide, silica, fluorozirconate, or phosphate glass, or plastic such as fluorinated polymer polymethyl-methacrylate, or polycarbonate. As a non-limiting example, the clad layers 117a and 117b may be a transparent film.

It should be noted that one of the clad layers 117 (e.g., clad layer 117a) of each one of the plurality of light guide layers 111 is in contact with a portion of one of the clad layers 117 (e.g., clad layer 117b) of the adjacent one of the plurality of light guide layers 111. Thus, the portion of the clad layers 117a and 117b being in contact with each other may be regarded as a single cladding layer with a double thickness. Accordingly, at the uncovered portion of each of the plurality of light guide layers 111, only the clad layer 117a may be arranged. It would be understood from the principles and characteristics of optical fibers that the capability of confining light by cladding may depend, in part, on the thickness of the cladding. Specifically, cladding which has a sufficient thickness allows light to be confined in a core, and thus the light can be emitted from the cladding if the thickness of the cladding is thinner than a coherent length of the light. Therefore, in the present disclosure, the thickness of the clad layers 117 is selected so that the total thickness of the clad layers 117a and 117b being in contact with each other is greater than a coherent length of the light. For white light used in the present disclosure, a non-limiting example of the thickness of the clad layer 117 may be greater than about 0.5 micrometers and about 1 micrometer or less. Specific examples of the thickness are about 0.5 micrometers, about 0.6 micrometers, about 0.7 micrometers, about 0.8 micrometers, about 0.9 micrometers and about 1 micrometer, and ranges between any two of these values.

It would also be understood that the core layer 116 has a relatively higher refractive index, whereas the clad layers 117a and 117b have a relatively lower refractive index. In one example, the refractive index of the core layer 116 may be about 1.5 or more. Further, the refractive index of the clad layer 117 may be about 1.3 or less. The materials selected for the core layer 116 and the clad layers 117a and 117b have inherent refractive indices. Thus, the material of the core layer 116 may be selected relative to the material of the clad layers 117a and 117b in view of these refractive indices.

Further, in a non-limiting example, the diffusion layer 115 may be arranged on the tiered surface of the tiered structure 110, i.e., the uncovered portion of the plurality of light guide layers 111 as discussed above.

Figure 12:
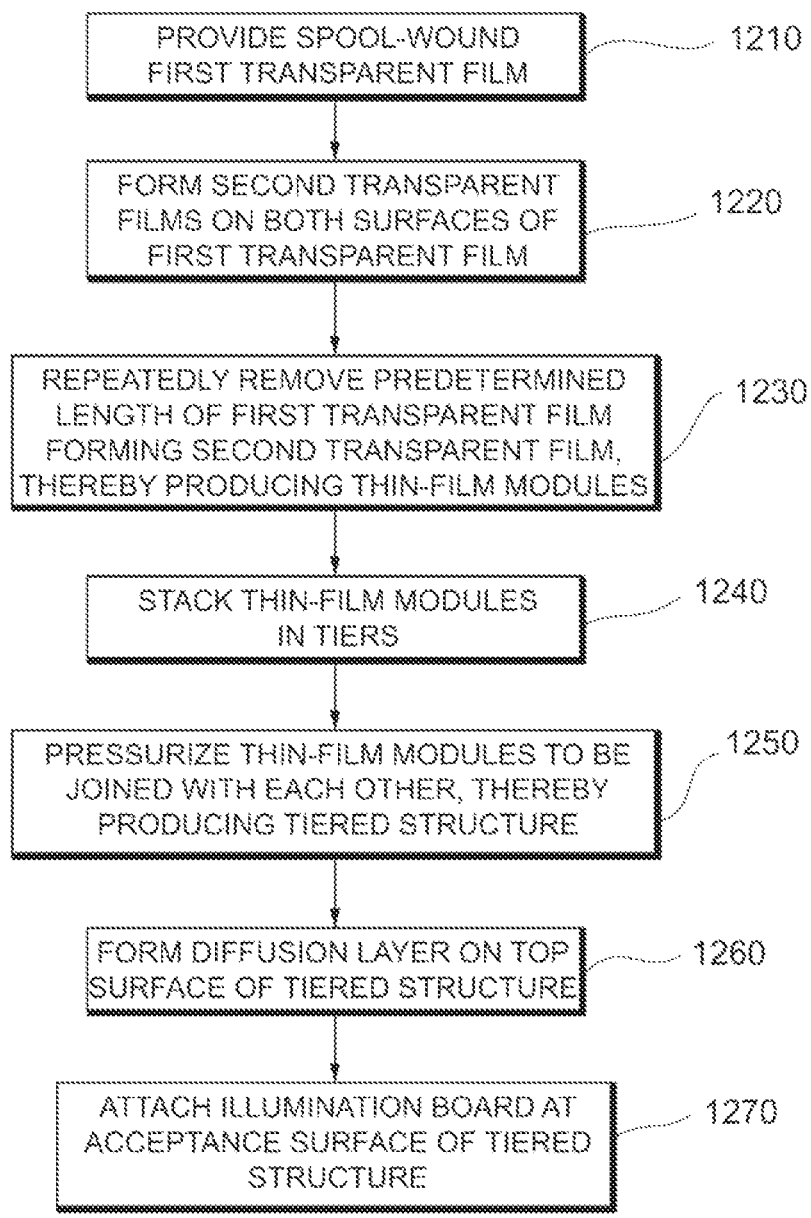
FIG. 12 is a flow chart showing another example of a manufacturing method that is arranged for a lighting device in accordance with the present disclosure.

FIG. 12 is a flow chart showing an example of a manufacturing method that is arranged for a lighting device in accordance with the present disclosure. As a non-limiting example, a roll-to-roll process may be adapted for manufacturing the lighting device 100, using an already-existing product line.

Referring to FIG. 12, in an operation 1210, a first transparent film wound on a spool is provided at a predetermined position. The first transparent film is a material which serves as the core layer 116 discussed above. In an operation 1220, the first transparent film may be rolled out from the spool, and second transparent films may be continuously formed on both surfaces of the first transparent film by, for example, slit coating. Alternatively, chemical vapor deposition (CVD) may also be applicable. The second transparent film is a material which serves as the clad layer 117 discussed above. In an operation 1230, a predetermined length of the first transparent film forming the second transparent films thereon may be removed by, for example, a cutter, a scissor, or a laser. The result thereof is referred to hereafter as a thin-film module. In an operation 1240, once the thin-film module is removed, it is stacked in such an order so as to be arranged in tiers. A plurality of thin-film modules stacked in tiers of different lengths may be provided in a manner of repeating the operations 1230 and 1240. In an operation 1250, the thin-film modules stacked in tiers may be pressurized by heated pressure rollers to be joined to each other. The result thereof may be referred to as a semi-finished tiered structure. The heated pressure rollers may be made of an elastic material so as to be able to meet the tiered surface of the semifinished tiered structure. In the case of the above heated pressure rolling process, a product line may be simplified, and allow series production. In an operation 1260, the semifinished tiered structure may be coated by the diffusion layer 115 by, for example, slit coating or roll coating. A well-known coating apparatus and method may be used. After the pressurization, a rear portion of the semifinished tiered structure forming the diffusion layer 115 thereon may be trimmed in order to establish an acceptance surface to receive light. As a result, the tiered structure 110 may be produced. Lastly, in an operation 1270, the illumination board 120 may be attached to the acceptance surface of the tiered structure.

FIG. 13 is a schematic illustration showing a non-limiting example of a part of a manufacturing method that is arranged for a lighting device in accordance with the present disclosure. More specifically, FIG. 13 illustrates an example of a process of producing a plurality of thin-film modules arranged in tiers as discussed in FIG. 12.

Referring to FIG. 13, a slit coater 1310 may be arranged on a traveling path of a transparent film 1001 wound on a spool 1010. The first transparent film 1005 rolled out from the spool 1010 may enter the slit coater 1310, and second transparent films 1004 may be formed on both surfaces of the first transparent film 1001 by the slit coater 1310. The first transparent film 1001 forming the second transparent films 1006 thereon may be removed at a predetermined length by, for example, a cutter 1030, and thereby the thin-film module 1005 may be obtained. The thin-film module 1005 may be placed on, and conveyed by a conveyor belt 1042 of a stacking apparatus 1040. Following this, as discussed above, the stacking apparatus 1040 may stack up the thin-film modules 1005 in tiers on the substrate 112 as shown in FIG. 10B.

As a result of the various configurations described in detail above, the present disclosure may include one or more following advantages, some of which have been discussed above. According to the present disclosure, as a tiered structure may be adapted for a modular structure, an illumination area can easily be expanded by way of stacking up a plurality of thin-film modules. Further, each layer of the plurality of thin-film modules may assume a reasonable area to emit light, thereby allowing design accuracy and homogeneity thereof to be maintained. Thus, such a configuration of a lighting device facilitates the provision of a wide illumination area. Furthermore, for the production of a lighting device, it is unnecessary to design optical elements and/or provide a precise molding, and, as a consequence of this result, the cost of manufacturing can be saved.

While the technology has been described with respect to a limited number of embodiments, those skilled in the art, having the benefit of this disclosure, will appreciate that other embodiments can be devised which do not depart from the scope of the technology as disclosed herein. Accordingly, the scope of the technology should be limited only by the attached claims.

What is claimed is:

1. A lighting device comprising:
a tiered structure including a plurality of light guide layers being arranged in tiers wherein a portion of a first surface of each lower one of the plurality of light guide layers that is not covered by an upper one of the plurality of light guide layers defines an uncovered portion of the first surface, edges of one end portions of the plurality of light guide layers being arranged in a plane to form an acceptance surface of the tiered structure; and
at least one light emitting device positioned at the acceptance surface and configured to emit light into the plurality of light guide layers through the acceptance surface,
wherein each of the plurality of light guide layers is configured to transmit the light therein and to emit the light from the uncovered portion of the first surface thereof,
wherein the at least one light emitting device is a light emitting diode packaged in resin,
wherein the at least one light emitting device comprises a light intensity adjuster arranged on a front surface of a package, the front surface facing the acceptance surface, and configured to reflect a part of the light emitted from the light emitting diode, and
wherein the light intensity adjuster is further configured such that as the one end portion becomes more distant from the uncovered portion of each one of the plurality of light guide layers, the intensity of the light becomes higher.

2. The lighting device according to claim 1, further comprising a plurality of reflective layers each arranged on a second surface opposite to the first surface of each of the plurality of light guide layers.

3. The lighting device according to claim 1, further comprising a diffusion layer arranged on the uncovered portions of the plurality of light guide layers and configured to diffuse the light.

4. The lighting device according to claim 3, wherein the diffusion layer is arranged to cover an edge of another end portion opposite to the one end portion in a lengthwise direction of each of the plurality of light guide layers.

5. The lighting device according to claim 4, wherein the edge of the other end portion opposite to the one end portion of each one of the plurality of light guide layers is configured to be chamfered.

6. The lighting device according to claim 1, wherein a plurality of light emitting devices are positioned in arrays in a width direction of the plurality of light guide layers.

7. The lighting device according to claim 1, further comprising a substrate on which a first one of the plurality of light guide layers is layered.

8. The lighting device according to claim 1, wherein each of the plurality of light guide layers is formed in a substantially rectangular shape in a plane parallel to the first surface thereof.

9. The lighting device according to claim 1, wherein a periphery of each of the plurality of light guide layers has a curved portion.

10. The lighting device according to claim 1, wherein the light intensity adjuster is configured by reflective fragments.

11. The lighting device according to claim 1, wherein the light intensity adjuster is configured by shielding fragments.

12. The lighting device according to claim 2, wherein each of the reflective layers includes a dielectric multilayer configured to reflect the light which has a specific wavelength.

13. The lighting device according to claim 12, further comprising a diffusion layer arranged on the uncovered portions of the plurality of light guide layers and configured to diffuse the light,
wherein the at least one light emitting device is configured to emit the light which has the specific wavelength, and
wherein the diffusion layer includes a phosphor layer configured to emit light which has a wavelength complementary to the specific wavelength.

14. The lighting device according to claim 13, wherein the diffusion layers contain phosphor particles.

15. The lighting device according to claim 1, further comprising a beam expander positioned between the at least one light emitting device and the acceptance surface of the tiered structure and configured to adjust the dimension of beams of the light emitted from the at least one light emitting device.

16. The lighting device according to claim 1, wherein the uncovered portions of ones of the plurality of light guide layers are different in area.

17. The lighting device according to claim 1, wherein each of the plurality of light guide layers includes a core layer which has a first refractive index and clad layers which have a second refractive index lower than the first refractive index, the clad layers being formed on a first surface and a second surface of the core layer, the second surface being opposite to the first surface.

18. The lighting device according to claim 17, wherein one of the clad layers of each one of the plurality of light guide layers is in contact with one of the clad layers of another of the plurality of light guide layers.

19. The lighting device according to claim 18, wherein a thickness of each one of the plurality of light guide layers is selected such that a total thickness of the clad layers being in contact with each other is greater than a coherent length of the light.

20. The lighting device according to claim 17, wherein each of the plurality of light guide layers is made of a transparent material.

21. A method of manufacturing a lighting device, the method comprising:
forming a plurality of thin-film modules, each of which is a different length, each of the plurality of thin-film modules including a transparent film forming a reflective layer on a first surface thereof;
stacking the plurality of thin-film modules in tiers to form an uncovered portion of the first surface of each one of the plurality of thin-film modules and forming an acceptance surface by arranging edges of one end portions of the plurality of thin-film modules in a plane, the first surface of each lower one of the plurality of thin-film modules on which the reflective layer is formed facing a second surface opposite to the first surface of each upper one of the plurality of thin-film modules;
pressurizing the plurality of thin-film modules to be joined with one another;
forming a diffusion layer by coating the uncovered portions of the first surfaces of the plurality of thin-film modules; and
attaching at least one light emitting device to the acceptance surface,
wherein the at least one light emitting device is a light emitting diode packaged in resin,
wherein the at least one light emitting device comprises a light intensity adjuster arranged on a front surface of a package, the front surface facing the acceptance surface, and configured to reflect a part of the light emitted from the light emitting diode, and wherein the light intensity adjuster is further configured such that as the one end portion becomes more distant from the uncovered portion of each one of the plurality of thin-film modules, the intensity of the light becomes higher.

22. The method according to claim 21, wherein the forming of the plurality of thin-film modules comprises:
providing a portion of a continuously-formed transparent film;
forming a reflective layer on a surface of the portion of the continuously-formed transparent film; and
removing a predetermined length of the portion of the continuously-formed transparent film.

23. A method of manufacturing a lighting device, the method comprising:
forming a plurality of thin-film modules, each of which is a different length, each of the plurality of thin-film modules including a first transparent film with a first refractive index forming second transparent films on a first surface and a second surface of the first transparent film, the second surface being opposite to the first surface;
stacking the plurality of thin-film modules in tiers to form an uncovered portion of the first surface of each one of the plurality of thin-film modules and forming an acceptance surface by arranging surfaces of one end portions of the plurality of thin-film modules in a plane, the first surface of each lower one of the plurality of thin-film modules on which the reflective layer is formed facing a second surface opposite to the first surface of each upper one of the plurality of thin-film modules;
pressurizing the plurality of thin-film modules to be joined with one another;
forming a diffusion layer by coating the uncovered portions of the first surfaces of the plurality of thin-film modules; and
attaching at least one light emitting device to the acceptance surface,
wherein the at least one light emitting device is a light emitting diode packaged in resin,
wherein the at least one light emitting device comprises a light intensity adjuster arranged on a front surface of a package, the front surface facing the acceptance surface, and configured to reflect a part of the light emitted from the light emitting diode, and
wherein the light intensity adjuster is further configured such that as the one end portion becomes more distant from the uncovered portion of each one of the plurality of thin-film modules, the intensity of the light becomes higher.

* * * * *

UNITED STATES PATENT AND TRADEMARK OFFICE
CERTIFICATE OF CORRECTION

| | | |
|---|---|---|
| PATENT NO. | : 8,956,038 B2 | Page 1 of 1 |
| APPLICATION NO. | : 13/575367 | |
| DATED | : February 17, 2015 | |
| INVENTOR(S) | : Kusuura | |

It is certified that error appears in the above-identified patent and that said Letters Patent is hereby corrected as shown below:

Title Page

On Page 2, in Item (56), under "OTHER PUBLICATIONS", in Column 2, Line 5, delete "Ashahi" and insert -- Asahi --, therefor.

On Page 2, in Item (56), under "OTHER PUBLICATIONS", in Column 2, Line 37, delete "permittivites,"" and insert -- permittivities," --, therefor.

In the Specification

In Column 2, Line 20, delete "art" and insert -- an --, therefor.

In Column 2, Line 38, delete "is" and insert -- is a --, therefor.

In Column 3, Line 31, delete "layers." and insert -- 40 layers. --, therefor.

In Column 7, Line 20, delete "120." and insert -- 121. --, therefor.

In Column 7, Line 22, delete "120." and insert -- 121. --, therefor.

In Column 8, Line 27, delete "steps. The" and insert -- steps, the --, therefor.

Signed and Sealed this
Twenty-first Day of July, 2015

Michelle K. Lee
*Director of the United States Patent and Trademark Office*